UNITED STATES PATENT OFFICE.

WILFRID PAUL HEATH, OF CHICAGO, ILLINOIS.

PROCESS OF MAKING BUTTER.

1,384,318. Specification of Letters Patent. Patented July 12, 1921.

No Drawing. Application filed January 12, 1920. Serial No. 350,949.

*To all whom it may concern:*

Be it known that I, WILFRID PAUL HEATH, a citizen of the United States, resident of Chicago, in the county of Cook and State of Illinois, have invented certain new and useful Improvements in Processes of Making Butter, of which the following is a specification.

In the ordinary process of making butter it usually requires from thirty minutes to an hour of churning to gather the butter fat globules into small masses, varying from wheat sized kernels to balls the size of ordinary marbles. At this point in the churning operation the buttermilk is withdrawn from the churn and the granules are "gathered," and salted, after washing first with pure water. The resulting mass of butter has approximately the following compositions: butter fat eighty-two per cent.; salt three per cent.; moisture fourteen per cent.; casein or curd one per cent. This is the composition by weight. By volume all butter contains minute globules of air or gas. It is desirable that this gas contribute to the flavor, purity and keeping quality of the butter. Hitherto butter has been churned in an atmosphere of dust and germ laden air, and the butter has incorporated in it air in a very fine state of division. In time butter containing cells of air imprisoned in its mass deteriorates, the oxygen causing chemical changes to take place in the butter and the butter to become rancid.

My invention consists in churning the cream into butter in an atmosphere of carbon dioxide or other sterile gas by which is meant any gas inert to produce chemical changes in the butter.

In carrying out my invention I inject the gas into the bottom of the churn containing the cream, under suitable pressure, a pressure of about fifteen pounds per square inch being usually supplied. Carbon dioxide being 52.9 per cent. heavier than air, as it bubbles through the cream in the churn, forces the lighter air out of the air vent at the top of the churn which is left open. When the pungent odor escaping from the churn indicates that the air has been practically all expelled, the churn vent is closed; the supply of gas is cut off, and the churn is put in motion. The churning process is carried out in the usual manner. The resulting butter will be free from air, but will have minute globules of the sterile gas incorporated therein. This gas will contribute to the flavor, purity and keeping qualities of the butter.

I claim as my invention:

1. The improvement in the process of manufacturing butter, which consists in confining the cream in a suitable churn, injecting a sterile gas into said churn, and thereby expelling the air therefrom, and creating in the churn an atmosphere of sterile gas, and agitating or stirring said cream while confined in said gaseous atmosphere, thereby causing the gas to be incorporated in the resulting butter.

2. The improvement in the process of manufacturing butter which consists in confining the cream in a suitable churn, injecting carbon dioxid into said churn and thereby expelling the air therefrom, and creating, in the churn, an atmosphere of carbon dioxid gas, and agitating or stirring said cream while confined in said gaseous atmosphere, thereby causing the gas to be incorporated in the resulting butter.

3. The improvement in the process of manufacturing butter which consists in confining the cream in a suitable churn, injecting a sterile gas into the lower part of the mass of cream whereby the gas will pass up through said cream and expel the air therefrom and from said churn, creating, in the churn, an atmosphere of sterile gas, and agitating or stirring said cream while confined in said gaseous atmosphere, thereby causing the gas to be incorporated in the resulting butter.

4. The improvement in the process of manufacturing butter which consists in confining the cream in a suitable churn, injecting carbon dioxid gas into the lower part of the mass of cream whereby the gas will pass up through said cream and expel the air therefrom and from said churn, creating, in the churn, an atmosphere of carbon dioxid gas, and agitating or stirring said cream while confined in said gaseous atmosphere, thereby causing the gas to be incorporated in the resulting butter.

In witness whereof, I have hereunto set my hand this 9th day of January, 1920.

WILFRID PAUL HEATH.

Witnesses:
ELIZABETH H. RYAN,
KATHRYN L. HECLEMAN.